UNITED STATES PATENT OFFICE.

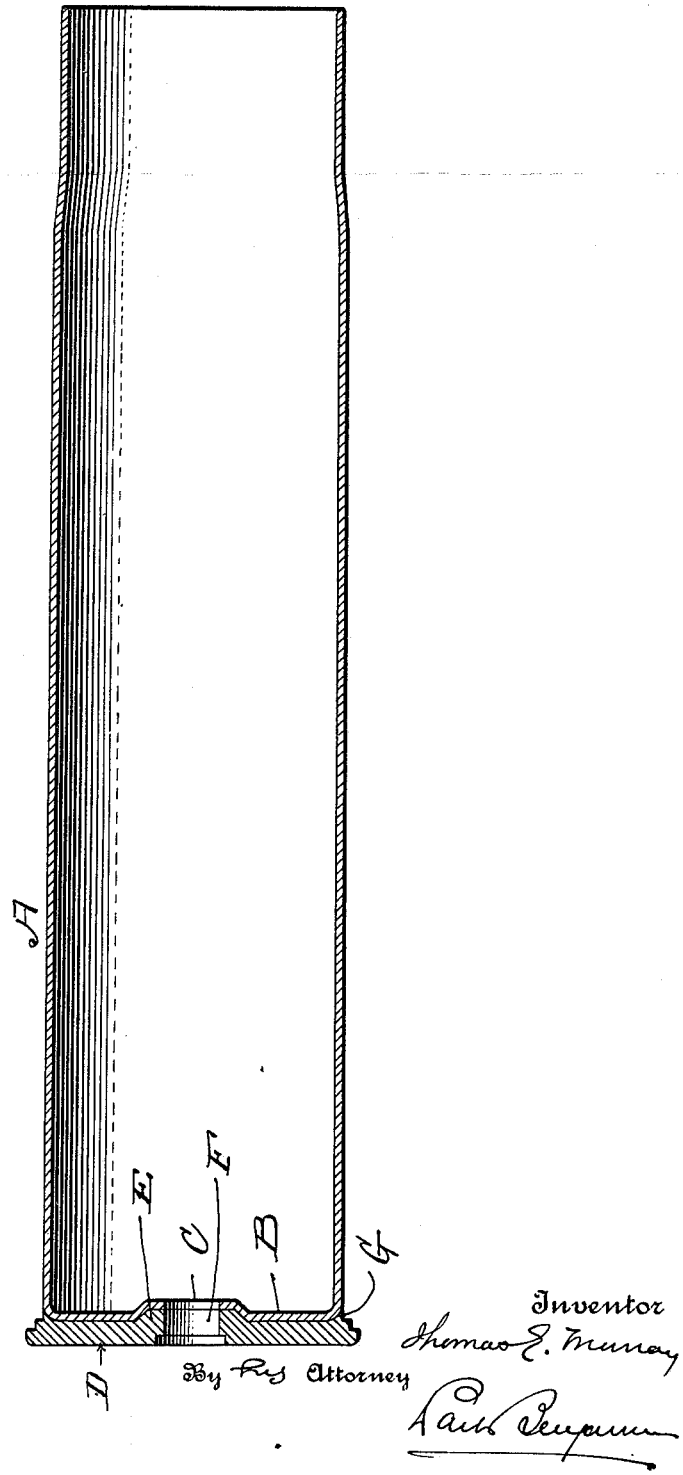

THOMAS E. MURRAY, OF NEW YORK, N. Y.

TUBULAR CARTRIDGE-SHELL.

1,267,257.　　　　Specification of Letters Patent.　　Patented May 21, 1918.

Application filed January 21, 1918. Serial No. 212,899.

*To all whom it may concern:*

Be it known that I, THOMAS E. MURRAY, a citizen of the United States, residing at New York, in the county of New York and State of New York, have invented a certain new and useful Improvement in Tubular Cartridge-Shells, of which the following is a specification.

The invention relates to tubular cartridge shells for fixed ammunition, and consists in the shell formed from sheet metal in tubular shape, with an integral head, to which integral head a reinforcing disk of metal is electrically welded. The object is to cheapen and simplify the construction.

The accompanying drawing is a longitudinal section of my cartridge case.

A is the shell, tubular in form and having an integral head B. In said head is a recess or depression, and in said recess there is a central opening C for the reception of the usual primer or fuse. D is a reinforcing disk of metal having a central projection E which fits in the recess in the shell head B and has a central opening F registering with opening C. The circumferential edge of disk D preferably overlaps the angle between the head B and the cylindrical wall of the shell. After the head B and disk D are placed in face contact, they are united by electric welding, so that they become an integral mass of a strength much greater than the sheet metal forming the shell body. This strength is still further increased by making the reinforcing disk D of greater thickness than said sheet metal body, as shown in the drawing.

I claim:

1. A cartridge shell, comprising a tube of sheet metal having an integrally formed head at one end, and a reinforcing disk of metal electrically welded to and in face contact with said shell head.

2. A cartridge shell, comprising a tube of sheet metal having an integrally formed head at one end and a circular reinforcing disk of metal electrically welded to the outer face of said head.

3. A cartridge shell, as set forth in claim 2, the thickness of said disk being greater than the thickness of the metal of said shell.

4. A cartridge shell, as set forth in claim 2, the said disk having a central projection of greater thickness than the remainder of said disk, and the said shell head having a central recess receiving said projection, the said projection entering said recess and being electrically welded therein.

5. A cartridge shell, as set forth in claim 2, the said disk having a central annular projection of greater thickness than the remainder of said disk, and the said shell head having a central recess receiving said projection, there being a central opening in said recess registering with the opening in said annular projection, the said projection entering said recess and being electrically welded therein.

In testimony whereof I have affixed my signature in presence of two witnesses.

THOMAS E. MURRAY.

Witnesses:
GERTRUDE T. PORTER,
MAY T. McGARRY.